United States Patent [19]

Singh et al.

[11] Patent Number: 4,898,792
[45] Date of Patent: Feb. 6, 1990

[54] ELECTROCHEMICAL GENERATOR APPARATUS CONTAINING MODIFIED HIGH TEMPERATURE INSULATION AND COATED SURFACES FOR USE WITH HYDROCARBON FUELS

[75] Inventors: Prabhakar Singh, Export; Roswell J. Ruka, Churchill; Raymond A. George, Forest Hills, all of Pa.

[73] Assignee: Westinghouse Electric Corp., Pittsburgh, Pa.

[21] Appl. No.: 280,915

[22] Filed: Dec. 7, 1988

[51] Int. Cl.⁴ .......................................... H01M 8/06
[52] U.S. Cl. ........................................ 429/19; 429/31
[58] Field of Search ...................... 429/30, 31, 33, 40, 429/19

[56] References Cited

U.S. PATENT DOCUMENTS

| | | | |
|---|---|---|---|
| 4,374,184 | 2/1983 | Somers et al. | 429/17 |
| 4,451,578 | 5/1984 | Setzer et al. | 502/303 |
| 4,490,444 | 12/1984 | Isenberg | 429/31 |
| 4,582,766 | 4/1986 | Isenberg et al. | 429/30 |
| 4,640,875 | 2/1987 | Makiel | 429/30 |
| 4,664,987 | 5/1987 | Isenberg | 429/31 |
| 4,702,971 | 10/1987 | Isenberg | 429/31 |
| 4,728,584 | 3/1988 | Isenberg | 429/31 |
| 4,774,152 | 9/1988 | Matsumura et al. | 429/40 |

Primary Examiner—Donald L. Walton
Attorney, Agent, or Firm—Daniel P. Cillo

[57] ABSTRACT

An electrochemical generator apparatus (30) is constructed containing an electrochemical cell assembly which contains a plurality of electrochemical cells or cell bundles (41) and (43) and insulation materials in the form of at least one of porous partition boards (33) between cell bundles, porous generator insulation (44), porous cell support boards (45), porous fuel entry distribution boards (35), and porous fuel conditioner boards (53), where a gaseous fuel (46) containing hydrocarbons will contact the insulation materials, characterized in that at least one of the insulation materials is impregnated with metal atom containing material, where the metal is selected from the group consisting of (A) metals selected from the group consisting of Mg, Ca-Al combinations, Sr-Al combinations, Ce, Ba, and mixtures thereof, and, (A) metals plus Ni. The impregnated insulation materials may also be pre-heated in air so that the oxides are formed prior to their insertion into the generator apparatus. These electrochemical cells are contacted with a hydrocarbon fuel gas and operated at over 700° C. The metal oxides formed are effective in preventing cell assembly deterioration due to carbon deposition from the hydrocarbon fuel and any elemental nickel formed is effective as a fuel reforming medium.

23 Claims, 2 Drawing Sheets

ELECTROCHEMICAL GENERATOR APPARATUS CONTAINING MODIFIED HIGH TEMPERATURE INSULATION AND COATED SURFACES FOR USE WITH HYDROCARBON FUELS

BACKGROUND OF THE INVENTION

1. Field of the Invention

The present invention relates to an electrochemical generator apparatus having gaseous oxidant and gaseous hydrocarbon fuel entry means, and containing solid oxide electrochemical cell bundles surrounded and separated by high temperature insulation materials; where the hydrocarbon fuel contacts the surface of materials in the apparatus which are impregnated and/or coated with selected chemicals. The chemical impregnated surfaces are heated in an atmosphere which will form metal oxides or metal oxides plus nickel from the chemicals. The metal oxides prevent degradation which is caused by carbon formation, and, when nickel is included, the combination can also improve the reforming capabilities of the generator.

2. Description of the Prior Art

High temperature solid oxide fuel cells and multi-cell generators have been designed for converting chemical energy into direct current electrical energy, typically in the temperature range of from 700° C. to 1,200° C. Such solid oxide fuel cells, solid oxide fuel cell configurations, and solid oxide fuel cell generators are well known, and taught, for example, by Isenberg in U.S. Pat. Nos. 4,490,444; 4,664,987; and 4,728,584; Makiel in U.S. Pat. No. 4,640,875; and Somers et al., in U.S. Pat. No. 4,374,184.

In all of these applications, the cells in the cell bundles are connected within the insulation cavities and remain exposed to hydrocarbon or other fuels which are fed to contact the fuel electrode. The insulation surrounding the cells provides thermal and electrical insulating functions. The insulation is also placed between cell bundles and around the entire fuel cell assembly. Insulation material can also be fabricated into cell support blocks or boards, fuel distribution boards, and fuel conditioner boards. Insulation used with all of these cell designs is usually porous, low density alumina.

Utilization of both methane, and natural gas containing higher hydrocarbons as fuels is possible in the generator. In all the prior art designs, however, during long term operation on hydrocarbon fuels, there is a possibility of some performance degradation and electrical shorting between cell bundles through separating insulation and cell support blocks due to carbon deposition, especially when higher hydrocarbons are used in the fuel. Also, in some instances, during long term cell operation, fuel entry tubes, passages, and distribution boards may start to clog up due to carbon formation, and the main insulation itself, surrounding the entire cell assembly, i.e., next to the generator walls, can become coated and surrounded with encapsulating carbon, with some loss of insulation effect. Carbon formed on the fuel distribution board on which the cells rest, can also result in some loss of performance.

Carbon deposition on most of these surfaces is thought to result from lack of water adsorption on the surfaces, leading to minimal gasification of carbon from adsorbed hydrocarbons. If $H_2O$ is not present on the surface, the oxygen species necessary to react with adsorbed carbon species, to form CO and $CO_2$ gases, will not be present in sufficient quantity, and hence will result in formation of carbon which is encapsulating in nature and remains resistant to oxidation by the $H_2O$ present in the gaseous fuel atmosphere. Removal of such carbon, once formed, is usually difficult.

In the area of catalytic reforming of heavy gaseous and/or liquid hydrocarbons containing sulfur, utilizing the injection of steam to produce hydrogen, but not involving fuel cells, Setzer et al., in U.S. Pat. No. 4,451,578, teaches high activity iron oxide catalysts which demonstrate a better resistance to carbon plugging than nickel catalysts. The catalyst can be unsupported and contain 90% FeO or $Fe_2O_3$ plus modifiers such as $Al_2O_3$, $K_2O$, CaO or $SiO_2$, or the catalyst can be unmodified, and supported on $Al_2O_3$, CaO impregnated $Al_2O_3$ and La stabilized $Al_2O_3$. In a typical example, 0.318 cm (0.125 inch) diameter $Al_2O_3$ pellets were impregnated with $Ca(NO_3)_2$, placed in an ultrasonic blender, dried, and then calcined at 1,010° C. This material was then impregnated with $Fe(NO_3)_3 \cdot H_2O$, dried, and then calcined at 1,000° C.

Carbon deposition on metal conduits or metal chambers containing Ni, Fe, and Co, utilized in hydrocarbon thermal cracking apparatus, was recognized by Watanabe et al., in U.S. Pat. No. 4,692,313. In this patent, thermal cracking is used to provide smaller hydrocarbon fractions. The cracked hydrocarbons are not eliminated. There, a carbon formation inhibitor element, selected from Li, Na, K, Ba, Be, Ca, Mg, or their oxides, is incorporated directly into the metal alloy of the conduit or chamber. Alternatively, a carbon deposition suppressing inner layer, containing a Li, Na, K, Ba, Be, Ca, or Mg inhibitor element, or their oxides, usually with chromium alloy, is cast or plasma sprayed onto the inner surface of the metal conduit or metal chamber. The usual ratio of chromium alloy inhibitor element or their oxides, in the inner layer, is about 10:1.

What is needed, for electrochemical generators using a gaseous hydrocarbon fuel and operating at 700° C. to 1,200° C., is a means to prevent carbon formation on separating insulation partitions for cell bundles, cell support blocks, main generator insulation, fuel conditioner boards, and fuel entry tubes, passages and distribution boards. The main object of this invention to provide such a means.

SUMMARY OF THE INVENTION

Accordingly, the present invention resides, generally, in an electrochemical generator apparatus containing an electrochemical cell assembly comprising a plurality of electrochemical cells or cell bundles, usually fuel cell bundles, and insulation materials in the form of at least one of porous partition boards between the cell bundles, porous generator insulation, porous cell support boards, porous fuel entry distribution boards, and porous fuel conditioner boards, where a gaseous fuel containing hydrocarbons will contact the insulation materials, characterized in that at least one of said insulation materials is impregnated with metal atom containing material, such as metal organic salts or metal inorganic salts, where the metal is selected from the group consisting of (A) metals selected from the group consisting of Mg, Ca - Al, Sr - Al, Ce, Ba, and mixtures thereof, with Mg and Ce preferred, and (A) metals plus Ni. When the impregnated insulation material is placed in a generator apparatus, and heated in a flow of nitrogen gas typically containing 5% to 10% by vol. hydrogen and 10% by vol. water vapor, as a preheating and start-up gas, the impregnated materials containing (A) metals will form oxides, while any nickel containing materials will form nickel metal. These oxides and nickel if present will remain in that form upon later contact with the fuel. The term "impregnated" as used herein means distributed throughout the bulk of the insulating material. The metal containing materials for initial impregnation or coating are preferably appropriate metal salts, which would include, preferably, nitrates, formates, and acetates. In some instances a soluble metal organic compound can be substituted.

In some instances, the chemicals impregnated into the insulation material will be pre-oxidized in air prior to insertion in the generator so that oxides will be present in the insulation material prior to generator startup. In such a case the invention also resides in an electrochemical generator apparatus containing an electrochemical cell assembly comprising a plurality of electrochemical cells or cell bundles and insulation materials in the form of at least one of porous partition boards between the cell bundles, porous generator insulation, porous cell support boards, porous fuel entry distribution boards, and porous fuel conditioner boards, where a gaseous fuel containing hydrocarbons will contact the insulation materials, characterized in that at least one of the insulation materials contains metal oxide, where the metal of the oxide is selected from the group consisting of (A) metals selected from the group consisting of Mg, Ca - Al, Sr - Al, Ce, Ba, and mixtures thereof, and (A) metals plus Ni. In this instance, heating in air (21% $O_2$) will oxidize any nickel present. However, when the generator is started up and heated in a flow of water containing nitrogen gas typically containing 5% to 10% by vol. hydrogen and 10% by vol. water vapor, any nickel oxide present will be reduced to nickel metal.

In the instance where the generator is operating at a temperature of over 700° C., in a flow of hydrocarbon fuel, all the chemicals impregnated into the insulation material, whether pre-oxidized or not, will be present in oxide form, except nickel, which will be in elemental metal form. In such a case, the invention also resides in an electrochemical generator apparatus, operating at a temperature of over 700° C., containing an electrochemical cell assembly comprising a plurality of electrochemical cells or cell bundles and insulation materials in the form of at least one of porous partition boards between cell bundles, porous generator insulation, porous cell support boards, porous fuel entry distribution boards, and porous fuel conditioner boards, where a gaseous fuel containing hydrocarbons contacts the insulation material, the improvement characterized in that at least one of the insulation materials contains metal material, where the metal material is selected from the group consisting of (A) metal oxides having metals selected from the group consisting of Mg, Ca - Al, Sr - Al, Ce, Ba, and mixtures thereof, and (A) metal oxides plus elemental Ni metal.

In the case of porous insulation partition boards, use of chemicals containing group (A) metal atoms is sufficient. In the case of porous generator insulation, use of chemicals containing group (A) metal atoms plus chemicals containing Ni is advantageous at the fuel contacting surface, since elemental Ni formed can additionally cause a reforming effect on the hydrocarbon fuel feed. For the rest of the porous generator insulation, near the generator walls, use of chemicals containing group (A) metal atoms is sufficient.

In the case of porous cell support boards, porous fuel entry distribution boards, and porous fuel conditioner boards, impregnation can be with chemicals previously described and containing group (A) metal atoms alone or in combination with chemicals containing Ni. In the case of the porous fuel conditioner boards, inclusion of Ni material is preferred. The invention is particularly advantageous when the partition boards and the fuel conditioner board, which is positioned in suitable internal or external location for complete or partial fuel reforming, are impregnated according to this invention. The invention further resides in coating the interior of fuel passage tubes, usually made of high temperature, oxidation resistant nickel alloys, with the chemicals previously described and containing group (A) metal atoms in combination with major amounts of chemicals containing Ni.

It has been found that the metal oxides previously described are effective in adsorbing $H_2O$, which can provide the oxygen required to combine with any carbon from adsorbed fuel species, to eliminate undesirable hydrocarbon cracking or hydrocarbon decomposition to form carbon. The metal salts and other chemicals used, and the metal oxides described, have been found not to interact and form compositions harmful to the fuel cells at 1,000° C. in the presence of hydrocarbon fuels.

The preferred carrier for the chemicals described is a solution in water or in an organic solvent. In the case of porous insulation material, the solution is preferably applied by vacuum impregnation. In the case of application to the interior of metal tubes and passages, the metal surface is degreased, abraded, and the solution is applied by painting, spraying, or the like, usually at room temperature. These oxides are effective in preventing cell assembly deterioration due to carbon deposition from the fuel gas feed.

BRIEF DESCRIPTION OF THE DRAWINGS

The invention will become more readily apparent from the following description thereof, shown by way of example only, in the accompanying drawings in which.

DESCRIPTION OF THE PREFERRED EMBODIMENTS

In a preferred form, fuel cells may include a porous support tube surrounded by a porous air electrode, or cathode. Generally surrounding the outer periphery of the air electrode is a layer of gas-tight solid electrolyte, generally comprised of yttria stabilized zirconia. A selected radial segment of the air electrode is masked during electrolyte deposition, and a layer of an interconnect material is deposited on this segment. The interconnect material extends over the active length of each elongated cell. The preferred interconnection material is lanthanum chromite doped with calcium, strontium or magnesium.

Substantially surrounding the solid electrolyte is a second porous electrode, for example, a nickel-zirconia or cobalt zirconia cermet fuel electrode, as anode. The anode is also discontinuous, being spaced from the interconnection a distance sufficient to avoid direct electrical communication between the anode and the interconnection and the cathode.

Electrical interconnection between cells is preferably enhanced by a porous metal felt, made of nickel fibers. The felt extends axially between the annular cells, and is bonded to each by pressure contact which causes sinter bonding during operation. Such cells and their operation are well known, and described in detail by U.S. Pat. No. 4,90,444, herein incorporated by reference.

Figure 1:
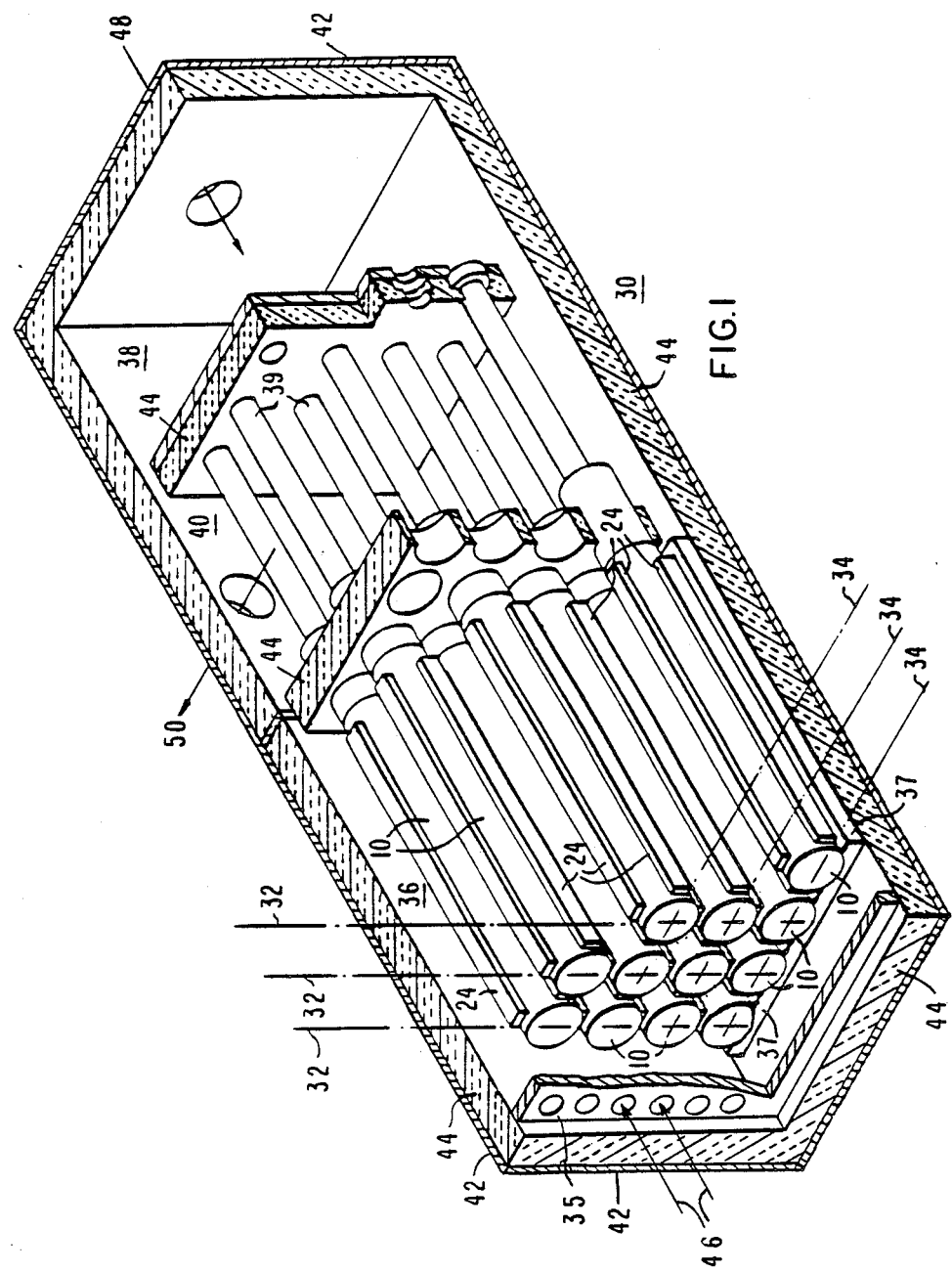
FIG. 1 is a broken perspective view of one embodiment of a fuel cell bundle supported by a cell support board and surrounded by generator insulation in the generating chamber of a fuel cell electrochemical power generator, also showing a cutaway portion of a fuel entry distribution board.

A fuel cell bundle is shown as a plurality of felt connected cells 10 in FIG. 1, assembled in one embodiment of an electrochemical power generator apparatus, shown as 30. As can be seen, the plurality of fuel cells 10 are connected in series through fiber metal felts 24 along the vertical rows 32, and in parallel along the horizontal rows 34, in electrical energy generating chamber 36. The fuel cell will operate at from 700° C. to 1,200° C. in generator chamber 36. Final connection is made to conductive metal plate or bus bar 37. The generator apparatus 30 can include an oxidant gas inlet chamber 38, and a combustion product or preheating chamber 40, all within an exterior metal housing 42.

Porous generator insulation 44, usually pressed alumina ($Al_2O_3$) felt, is shown throughout the generator 30. Stabilized zirconia, while more expensive, could also be used as felt for heat insulation. The generator insulation is shown in a much thinner section than would actually be the case. Fuel, shown as arrows 46, can enter generating chamber 36 through openings in the fuel entry distribution board 35, shown in cutaway section, which can be part of a fuel manifold system, not shown, and flow around the fuel cells 10. The fuel distribution board is porous, but may also have holes therethrough, and is usually made from pressed alumina ($Al_2O_3$) felt. The fuel is fed into the manifold by means of a fuel entry tube, not shown. Oxidant shown as arrow 48 can enter the inlet chamber 38 as shown, and flow into the center of the fuel cells through oxidant feed tubes 39. Combusted exhaust gas, shown as arrow 50 can exit the preheating chamber as shown or can exit counter-current to the oxidant 48 by an effective manifolding system, not shown.

Figure 2:
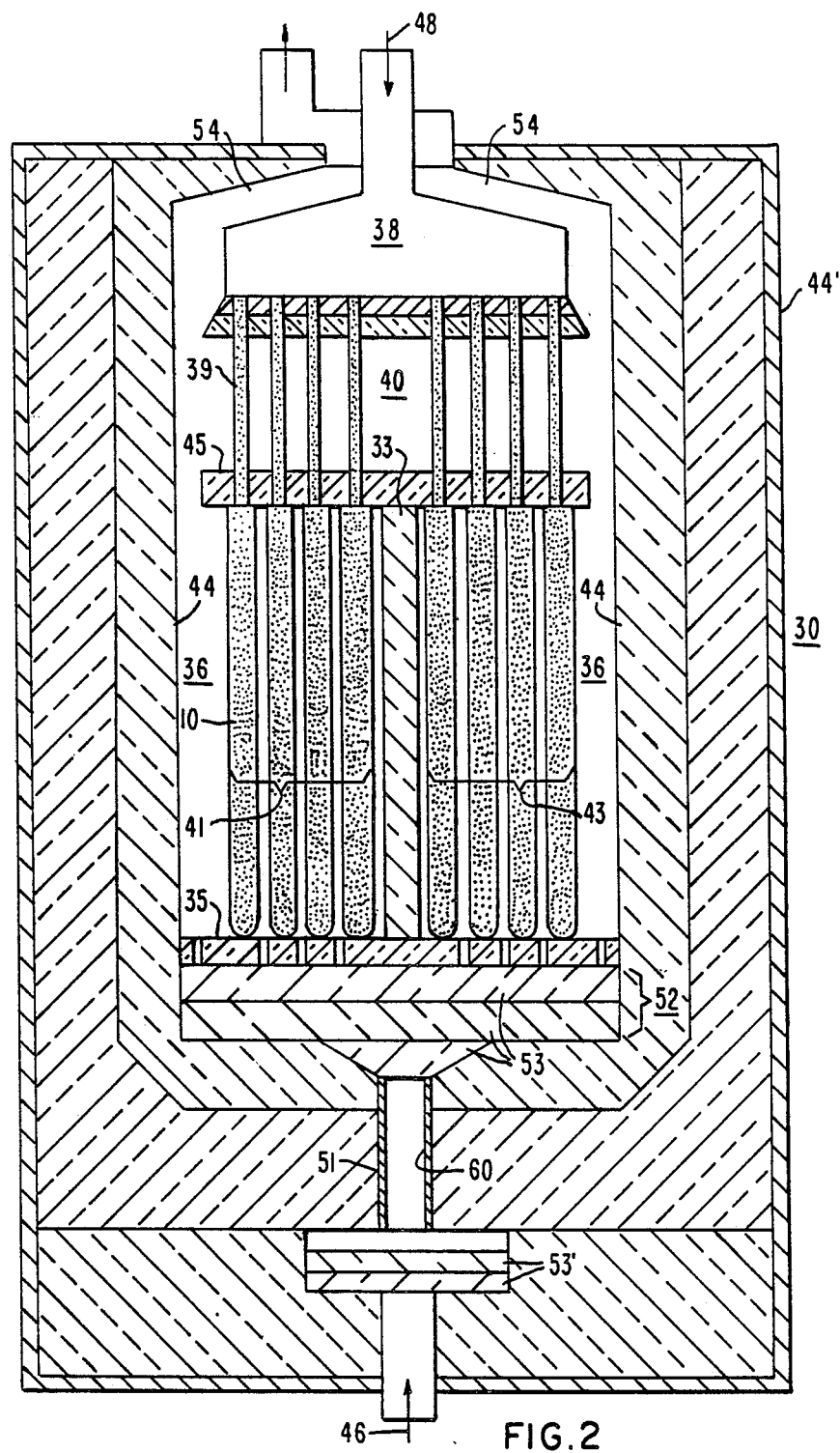
FIG. 2, which best illustrates this invention, is a perspective view partially in section of a fuel cell generator somewhat similar to that shown in FIG. 1, showing fuel cell bundles, a partition board between bundles, generator insulation, a cell support board, a fuel entry distribution board, fuel conditioner boards, and a fuel entry tube.

Each cell bundle, the plurality of felt connected cells 10, shown in FIG. 2, will be separated by porous cell bundle partition boards, shown as 33 in FIG. 2, also usually made from pressed alumina ($Al_2O_3$) felt. A generator can contain from 24 to 240 cells or more, arranged in cell bundles of 8 to 24 cells or more. The configuration of each of the electrochemical cells can be round, oval, flattened, triangular, corrugated, and the like.

Referring now to FIG. 2, a perspective view, partially in section, is shown of a fuel cell generator apparatus somewhat similar to that of FIG. 1. The generator apparatus 30 contains a plurality of fuel cells 10 and oxidant feed tubes 39, both shown dotted for clarity of illustration, disposed in generator chamber 36 and preheating chamber 40, respectively. Fiber metal felts for series and parallel connections and metal bus bars (24 and 37, respectively, in FIG. 1), are not shown. A porous insulation partition board 33 is disposed between cell bundle 41 and cell bundle 43.

Oxidant 48, preheated to between 600° C. and 700° C., would enter oxidant inlet chamber 38, pass into oxidant feed tubes 39, and then pass, via the feed tubes, through porous cell support board 45 into the interior of the fuel cells 10. Hydrocarbon fuel 46, at a preheated temperature of between 500° C. and 600° C., would pass through fuel entry tube 51, into a fuel manifold chamber 52, which may contain porous, fuel conditioner boards 53, used to distribute the fuel and/or to act in a reforming capacity. The temperature here would remain between 500° C. and 600° C.

The fuel then passes through porous fuel entry distribution board 35, which additionally has holes therethrough. The fuel entry distribution board 35 is near the fuel cells, and the temperature of the fuel will be raised to from 800° C. to 900° C. in this area. Optionally, another set of fuel conditioner boards 53' can be placed below the fuel manifold chamber 52 to insure good reformation if desired. Also, water vapor can be added independently to the fuel or added as a component part of recirculated spent fuel.

The fuel then passes into generator chamber 36 where it contacts the outside of the fuel cells 10, operating at about 1,000° C., the insulation partition board 33, the generator insulation 44, and the cell support board 45, and then enters the preheating chamber 40 where it mixes and combusts with depleted oxidant from inside the fuel cell. The mixture then passes, in the embodiment shown, through manifold 54 to exit the generator. The generator operates at a temperature of about 700° C. to 1,000° C. The generator apparatus can include an optional spent fuel recirculation means, not shown.

The hydrocarbon fuel, especially if it contains higher hydrocarbons, such as $C_2H_6$, $C_3H_8$, etc., can deposit carbon within the feed entry tube 51, and the like, and on and within fuel conditioner boards 53 or 53', fuel entry distribution board 35, insulation partition board 33, generator insulation 44, and the cell support board 45, all of which is detrimental to generator operation. All of the board-type material of components 53, 53', 35, 33, 44, and 45 comprise an electrochemical cell assembly, along with the fuel cell bundles, and will be made from insulation material, such as $Al_2O_3$, in a pressed felt of fiber or powder, and will be from 50% to 75% porous.

In this invention, where hydrocarbon containing fuel gas feed will contact the insulation materials, the invention involves impregnating at least one of the insulation materials with metal atom containing materials, such as metal organic salts or metal inorganic salts, where the metal is selected from the group consisting of: "(A) metals" defined as Mg, Ca - Al combinations, Sr-Al combinations, Ce, Ba, and their mixtures; and Mg, Ca - Al combinations, Sr - Al combinations, Ce, Ba, and their mixtures, plus Ni; i.e., (A) metals separate Ni. Of the (A) metals, Mg and Ce are preferred, with Mg being most preferred.

In some instances, only the generator insulation 44 may be impregnated, while in other instances only the insulation partition board 33 and the fuel conditioner board may be impregnated, etc. When the porous partition board 33 is to be impregnated, group (A) metal atom containing material inclusion proves sufficient. When the porous generator insulation 44 is to be impregnated, group (A) metal atom containing material and Ni containing material inclusion proves best near the fuel gas contact surface, but group (A) metal atom containing material inclusion alone is sufficient with generator insulation 44′ near the exterior housing 42. When the porous cell support boards 45, porous fuel entry distribution boards 35, and porous fuel conditioner boards 53 and/or 53′ are to be impregnated, either group (A) metal atom containing material inclusion alone or with Ni containing material can be used; but, in the case of the porous fuel conditioner boards 53 and/or 53′, where they are to function at least in part as a hydrocarbon fuel reforming medium, inclusion of Ni containing material is much preferred.

Another problem area for carbon deposition is inside fuel passage means, such as the fuel entry tubes 51, and to a lesser extent the exhaust chamber 54, and other fuel gas passages. These tubes and chambers are made in part or in whole of high temperature metals, such as Inconel nickel-chromium alloy steels. In these areas, particularly the fuel entry tube 51, an interior coating 60, including either group (A) metal atom containing material alone or with Ni containing material, is advantageous. Abrading the interior of the tube prior to any type of low temperature metal containing material application would be effective.

The metals can be applied to the various insulation materials or tubes, etc., as an aqueous salt solution, or in an organic carrier. The salts are preferably selected from the group consisting of nitrates, formates, and acetates. These are the metal atom containing materials originally impregnated into the insulation materials. Phosphates and particularly sulfates can produce vapors on heating that can harm the electrochemical cells, and are excluded. The preferred impregnant is an aqueous solution of magnesium acetate, $Mg(OOCCH_3)_2$ or $Mg(OOCCH_3)_2 \cdot 4H_2O$ or magnesium nitrate, $Mg(NO_3)_2 \cdot 2H_2O$, alone or with nickel acetate $Ni(OOCH_3)_2 \cdot 4H_2O$, or nickel nitrate $Ni(NO)_3 \cdot 6H_2O$.

When the fuel stream contains higher hydrocarbons, such as $C_2H_6$, $C_3H_8$, etc., metal salts which will provide oxides that are readily capable of adsorbing $H_2O$ are desirable. In this instance Mg salts are much preferred, as they provide MgO, which is a strong $H_2O$ adsorber, which adsorbed $H_2O$ can supply oxygen to react with adsorbed carbon, to form CO and $CO_2$ which are released into the fuel stream. By way of example, a salt containing a Ca-Al or Sr-Al combination could be $CaO \cdot Al_2O_3$ or $SrO \cdot Al_2O_3$.

Optionally, from 0.5 wt% to 6 wt% preferably 1 wt.% to 3 wt.%, based on metal oxide precursor weight, of a nonionic surface-active agent, i.e., nonionic surfactant, which reduces interfacial tension between the metal oxide precursor solution and the alumina fibers or particles of the insulation materials can be used when metal salt can be used for the impregnation procedure. These types of materials are well known in the art and can include alkylaryl ether alcohols, alkylaryl polyether alcohols, alkylaryl polyethylene glycol ethers, and the like. The surfactant is generally eliminated by vaporization or oxidation before the 1,000° C. operating temperature of the generator is reached. These materials help the impregnating solution wet the pore surfaces of the insulation materials. Before impregnation, the metal oxide precursor solution is de-aerated to remove trapped air, by a process such as boiling for a short period.

Preferably, for porous insulation materials, the metal atom containing material, such as a metal salt solution, is applied by vacuum impregnation techniques, where the insulation materials are pretreated before assembly into the generator by being placed in a container and drawing a vacuum. Then, the de-aerated solution is added to the container until the insulation materials are covered. This procedure ensures complete penetration of solution through the bulk of the insulation materials. Alternative but less preferred application techniques are pressurized spraying and dipping. After impregnation into the insulation materials, or application to the interior surfaces of metal tubes associated with the generator, the metal containing material is allowed to dry, preferably at approximately 25° C. They may then be reimpregnated or coated if desired and again dried.

In some cases, the impregnated, metal atom containing material can be heated in air, to provide the metal oxide form. Thus, using magnesium nitrate and nickel nitrate as examples of metal containing materials in solution form to be impregnated into insulation materials, after drying the solution at 25° C. in air, $Mg(NO_3)_2 + Ni(NO_3)_2$ result. These impregnated insulation materials, containing metal salt materials can be assembled into the generator apparatus. Alternately, the impregnated insulation material can be pre-oxidized by heating in air (21 % $O_2$) at approximately 600° C. to form metal containing material in the form of the metal oxides MgO+NiO impregnated through the insulation material. These pre-oxidized metal material containing insulation boards can also be assembled into the generator apparatus.

Upon start-up, the generator apparatus, at a temperature of about 300° C. to 1,000° C., is fed a water containing nitrogen gas also containing approximately 5% to 10% by vol. hydrogen. Usually a $N_2$-$H_2$ mixture is bubbled through water to provide, as an example, a start-up gas containing 85.5 vol. % $N_2$, 4.5 vol. % $H_2$, and 10 vol. % $H_2O$. This start up gas is oxidative to Mg, Ca, Al, Sr, Ce, and Ba, but reductive to Ni. Therefore, in the normal not oxidized case, the impregnated metal atom containing materials, combined nitrates of magnesium and nickel, $Mg(NO_3)_2 + Ni(NO_3)_2$, will form MgO+Ni (nickel elemental).

In the pre-oxidized case, the impregnated material in the form of the metal containing materials MgO +NiO will form MgO +Ni (nickel elemental), i.e., the MgO will remain oxidized and the NiO will be reduced. In both cases, the end result is the same prior to introduction of hydrocarbon fuel, i.e., MgO . Ni throughout the insulation. After the introduction of hydrocarbon fuel at 1,000° C. no change occurs, the magnesium remains at MgO and the nickel remains as Ni. Thus, in operational contact at over 700° C. with hydrocarbon fuel, the metal containing materials in the insulation would be MgO plus nickel metal.

Use of Mg salt, etc., in addition to Ni salt, when such is included, causes the MgO, etc., formed to behave in a matrix fashion around the nickel particles, keeping them separated and thus preventing nickel material agglomeration. The oxides are formed as small particles or film-like layers. if nickel is present, the oxides form as minute particles approximately 0.01 micrometer to 1 micrometer in diameter. This separation is very important when nickel material is included to provide a reforming effect on the surface of any of the insulating materials previously described. All these oxides are insulative in the generator environment except $CeO_2$ which is mildly conductive. Therefore, Ce salts would best not be included in the insulation partition board, 33 in FIG. 2.

These oxides, or mixture of oxides and a nickel metal, are distributed through the bulk of the insulation materials and as coatings on metal surfaces. And, as described previously, when incorporated as such in hot generator environment, result in the formation of $H_2$, CO, and $CO_2$ at the insulation surfaces, rather than the potential competing steps involved in undesirable cracking or hydrocarbon decomposition to form carbon. Thermal cracking to form smaller hydrocarbons is not desirable in the method described, and any reforming utilized will be to provide CO and $H_2$. Any elemental Ni metal, embedded and retained in the MgO, etc., matrix described previously and in such previously described, dispersed form, will be an excellent reformation medium for hydrocarbon fuel.

The invention will now be illustrated by reference to the following non-limiting Example.

EXAMPLE

Cylindrical, porous, insulation blocks of 1.27 cm diameter and containing three cylindrical holes of 0.25 cm diameter, were prepared from a standard alumina insulation block. We impregnated one 1.27 cm long block with magnesium nitrate solution prepared by dissolving MgO in dilute nitric acid. We impregnated another block 1.27 cm long with a solution of magnesium nitrate and approximately 10% by wt. of nickel nitrate. Blocks were soaked in the solution for approximately 5 minutes to ensure good impregnation. They were dried on a hot plate and then slowly heated to about 600° C. over about 6 hours in an oven in air. Brown fumes of nitric oxide were observed due to dissociation of the nitrate. After about 2 hours the blocks were removed from the furnace. They were subsequently heated to 800° C. to 900° C. for approximately 2 hours in air. After removal from the furnace, a slight coloration (cream) was observed on MgO treated blocks, whereas a greyish color was observed on NiO+MgO treated blocks. The insulation shape did not change. This provided pre-oxidized materials.

Treated and untreated insulation blocks were lined end to end in a high purity alumina reaction tube with untreated blocks 1 and 2 nearest fuel entry, and treated blocks 3 (MgO) and 4 (NiO-MgO) being sandwiched between blocks 1 and 2 and additional untreated blocks 5 and 6. Nickel reforming material was positioned after block 6 furthest from gas feed entry, and all were heated to 1,000° C. by a resistance furnace in a flow of 95% $N_2$-5% $H_2$, which is oxidative to Mg but reductive to Ni and which is essentially a fuel cell generator start-up gas. This provided Ni +MgO impregnated metal material. After stabilizing the temperature, the reaction atmosphere was changed to a $CH_4$ and steam fuel gas, with a steam-to-carbon ratio =3.0 to 1. A flow rate of 100 cc/min of $CH_4$ was maintained during the experiment and the exit gas was analyzed for $CH_4$. The experiment was conducted for 100 hours. During this period, no methane was observed in the exit gas.

After termination of the test, the first two untreated cylinders of insulation, untreated blocks 1 and 2, showed heavy carbon deposits within the gas passage and pores, whereas the modified insulation block 3, containing MgO, remained carbon-free. Some carbon was observed in the gas passage on fibers protruding in the gas space hole through block 3. Insulation block 4, containing MgO and reduced nickel, did not show any sign of carbon, in part, due to reformation of methane on highly dispersed nickel on that block. A subsequent experiment, using only MgO treated blocks, as blocks 3 and 4, showed only a slight amount of carbon deposition which appeared to be localized in areas of the block which were not coated by MgO. Use of acetate salt solutions in place of nitrate salt solutions showed uniform distribution of oxides within the insulation after pre-oxidation, and no carbon formation after start-up gas and fuel gas contact. The absence of carbon formation on the treated blocks indicates the adequacy of the treatment. This treatment can be utilized on porous alumina partition boards, cell support boards, fuel entry distribution boards, fuel conditioner boards, and generator insulation boards, as well as used as a coating on the inside of inlet tubes, and the like.

Subsequently, four porous alumina generator insulation boards, one porous alumina partition board and one porous alumina fuel distribution board were impregnated with an aqueous solution of about 50 mole % magnesium acetate and about 50 mole nickel acetate. The boards were dried at 70° C. to 90° C. to evaporate water but not eliminate acetate. The impregnated partition board was placed between two fuel cell bundles, each containing 18 cells, the fuel distribution board was placed near the fuel inlet, and the impregnated generator insulations boards were used as surrounding insulation for the separated fuel cell bundles in a 36 cell test generator apparatus. The generator was started up with a set 90 vol. % $N_2$, 5 vol. % $H_2$ gas to form MgO Ni metal, and then operated at approximately 1,000° C. At that temperature and in contact with a fuel feed of methane and natural gas, the MgO Ni metal remained as such. After 1,700 hours, the generator was disassembled. The partition, generator insulation boards and fuel distribution boards showed no carbon deposition.

We claim:

1. An electrochemical generator apparatus, containing an electrochemical cell assembly comprising a plurality of electrochemical cells and insulation materials in the form of at least one of porous partition boards between cell bundles, porous generator insulation, porous cell support boards, porous fuel entry distribution boards, and porous fuel conditioner boards, where a gaseous fuel containing hydrocarbons will contact the insulation materials, the improvement characterized in that at least one of the insulation materials is impregnated with metal atom containing material, where the metal is selected from the group consisting of (A) metals selected from the group consisting of Mg, Ca-Al, Sr-Al, Ce, Ba, and mixtures thereof, and, (A) metals plus Ni.

2. The electrochemical generator apparatus of claim 1, where the electrochemical cells are in the form of cell bundles of fuel cells and the fuel cells comprise a porous fuel electrode an air electrode, and a solid electrolyte therebetween.

3. The electrochemical generator apparatus of claim 1, where the metal of the metal atom containing material is selected from the group consisting of Mg, Ce, and mixtures thereof, and, Mg, Ce, and mixtures thereof plus Ni.

4. The electrochemical generator apparatus of claim 1, where the metal of the metal atom containing material is selected from the group consisting of Mg, and, Mg plus Ni.

5. The electrochemical generator apparatus of claim 1, where the impregnated insulation material is in the form of porous fuel conditioner boards, and where the metal of the metal atom containing material is selected from the group consisting of Mg, Ce, and mixtures thereof, and, Mg, Ce, and mixtures thereof plus Ni.

6. The electrochemical generator apparatus of claim 1, where the impregnated material is a porous partition board and where the metal of the metal atom containing material is selected from the group consisting of Mg, Ce, and mixtures thereof, and, Mg, Ce, and mixtures thereof plus Ni.

7. The electrochemical generator apparatus of claim 1 where the metal containing material is a metal salt and where the salt is selected from the group consisting of nitrate, formate and acetate.

8. The electrochemical generator of claim 1, where after impregnation of the insulating material and prior to assembly into the electrochemical cell assembly, the impregnated insulation material is heated in air to oxidize the metal containing material.

9. The electrochemical generator of claim 2, where the electrochemical cell assembly also includes a plurality of fuel passage means, and where the interior of the fuel passage means is coated with metal atom containing material, where the metal is selected from the group consisting of (A) metals selected from the group consisting of Mg, Ca-Al combinations, Sr-Al combinations, Ce, Ba, and mixtures thereof, and, (A) metals plus Ni.

10. An electrochemical generator apparatus containing an electrochemical cell assembly comprising a plurality of electrochemical cells and insulation materials in the form of at least one of porous partition boards between cell bundles, porous generator insulation, porous cell support boards, porous fuel entry distribution boards, and porous fuel conditioner boards, where a gaseous fuel containing hydrocarbons will contact the insulation materials, the improvement characterized in that at least one of the insulation materials contains metal oxide, where the metal of the oxide is selected from the group consisting of (A) metals selected from the group consisting of Mg, Ca-Al, Sr-Al, Ce, Ba, and mixtures thereof, and, (A) metals plus Ni.

11. The electrochemical generator apparatus of claim 10, where the electrochemical cells are in the form of cell bundles of fuel cells and the fuel cells comprise a porous fuel electrode an air electrode, and a solid electrolyte therebetween.

12. The electrochemical generator apparatus of claim 10, where the metal of the oxide is selected from the group consisting of Mg, Ce, and mixtures thereof, and, Mg, Ce, and mixtures thereof plus Ni.

13. The electrochemical generator apparatus of claim 10, where the metal of the oxide is selected from the group consisting of Mg, and, Mg plus Ni.

14. The electrochemical generator apparatus of claim 10, where the impregnated insulation material is in the form of porous fuel conditioner boards, and where the metal of the oxide is selected from the group consisting of Mg, Ce, and mixtures thereof, and, Mg, Ce, and mixtures thereof plus Ni.

15. The electrochemical generator apparatus of claim 10, where the impregnated material is a porous partition board and where the metal of the oxide is selected from the group consisting of Mg, Ce, and mixtures thereof, and, Mg, Ce, and mixtures thereof plus Ni.

16. The electrochemical generator of claim 11, where the electrochemical cell assembly also includes a plurality of fuel passage means, and where the interior of the fuel passage means is coated with metal containing material, where the metal is selected from the group consisting of (A) metals selected from the group consisting of Mg, Ca-Al combinations, Sr-Al combinations, Zr, Y, Ce, Ba, and mixtures thereof, and, (A) metals plus Ni.

17. An electrochemical generator apparatus, operating at a temperature of over 700° C. containing an electrochemical cell assembly comprising a plurality of electrochemical cells and insulation materials in the form of at least one of porous partition boards between cell bundles, porous generator insulation, porous cell support boards, porous fuel entry distribution boards, and porous fuel conditioner boards, where a gaseous fuel containing hydrocarbons contacts the insulation materials, the improvement characterized in that at least one of the insulation materials contain metal material where the metal material is selected from the group consisting of (A) metal oxides having metals selected from the group consisting of Mg, Ca-Al, Sr-Al, Ce, Ba, and mixtures thereof, and, (A) metal oxides plus elemental Ni metal.

18. The electrochemical generator apparatus of claim 17, where the electrochemical cells are in the form of cell bundles of fuel cells and the fuel cells comprise a porous fuel electrode an air electrode, and a solid electrolyte therebetween.

19. The electrochemical generator apparatus of claim 17, where the metal material is selected from the group consisting of Mg oxide, Ce oxide, and mixtures thereof, and, Mg oxide, Ce oxide, and mixtures thereof plus elemental Ni metal.

20. The electrochemical generator apparatus of claim 17, where the metal material is selected from the group consisting of Mg oxide, and, Mg oxide plus elemental Ni metal.

21. The electrochemical generator apparatus of claim 17, where the impregnated insulation material is in the form of porous fuel conditioner boards, and where the metal material is selected from the group consisting of Mg oxide, Ce oxide, and mixtures thereof, and, Mg oxide, Ce oxide and mixtures thereof with elemental Ni metal.

22. The electrochemical generator apparatus of claim 17, where the impregnated material is a porous partition board and where the metal material is selected from the group consisting of Mg oxide, Ce oxide, and mixtures thereof, and, Mg oxide, Ce oxide, and mixtures thereof plus elemental Ni metal.

23. The electrochemical generator of claim 18, where the electrochemical cell assembly also includes a fuel plurality of passage means and where the interior of the fuel passage means is coated with metal material, where the metal material is selected from the group consisting of (A) metal oxides having metals selected from the group consisting of Mg, Ca-Al combinations, Sr-Al combinations, Zr, Y, Ce, Ba, and mixtures thereof, and, (A) metal oxides plus elemental Ni metal.

* * * * *